United States Patent [19]

Nowak et al.

[11] Patent Number: 5,083,138
[45] Date of Patent: Jan. 21, 1992

[54] POLYGON SCANNER WITH PREDICTABLE FACET DEFORMATION CHARACTERISTICS

[75] Inventors: William J. Nowak, Webster; John H. Hinton, Ontario, both of N.Y.

[73] Assignee: Xerox Corporation, Stamford, Conn.

[21] Appl. No.: 508,140

[22] Filed: Apr. 11, 1990

[51] Int. Cl.$^5$ .............................................. G01D 9/42
[52] U.S. Cl. ...................................... 346/1.1; 346/108
[58] Field of Search .................. 346/107 R, 108, 160, 346/1.1; 350/6.5, 6.6, 6.7, 6.8, 6.9

[56] References Cited

U.S. PATENT DOCUMENTS

| | | | |
|---|---|---|---|
| 4,040,096 | 8/1977 | Starkweather | 358/302 |
| 4,624,528 | 11/1986 | Brueggemann | 350/6.7 |
| 4,853,710 | 8/1989 | Shimada et al. | 346/108 |
| 4,884,083 | 11/1989 | Loce et al. | 346/108 |
| 4,935,891 | 6/1990 | Curry | 364/721 |
| 4,971,413 | 11/1990 | Inoue | 350/6.8 |
| 4,978,184 | 12/1990 | Straayer | 350/6.8 |

FOREIGN PATENT DOCUMENTS

252309 2/1990 Japan .

Primary Examiner—Mark J. Reinhart

[57] ABSTRACT

Polygon scanners of the type used in ROS printers, are subject to centrifugal caused distortion at the mirror (facet) surface at certain rotational speeds. This distortion can affect the performance of the scanning beam at an image plane. Techniques are provided for predicting the radial facet distortion at expected rotational speeds, and for specific polygon designs. In one embodiment, the surfaces of the polygon facets are modified to incorporate the reverse of the radial distortion curve which is predicted at the rotational load. When operating at the rotational load, the facet surface then deforms to a desired planar (flat) configuration. In another embodiment, the polygon element structure is modified by adjusting the polygon modules of elasticity, weight density, and the polygon continuum to achieve a distorted facet surface at rotational speed which provides the functions normally provided by a post polygon lens.

9 Claims, 6 Drawing Sheets

POLYGON SCANNER WITH PREDICTABLE FACET DEFORMATION CHARACTERISTICS

BACKGROUND OF THE INVENTION

The present invention is related to a spot scanning system wherein laser generated scanning beams are reflected from a multi-faceted rotating polygon onto a photosensitive image recording medium. More particularly the invention is directed to methods for predicting the facet deformation produced at relatively high rotational speeds and using the predicted deformation characteristics to improve the efficiency of the scanning system.

Raster output scanners (ROS) are finding increasing use in high speeds xerographic machines such as copiers/duplicators and printers. Typical prior art system are shown, for example, in U.S. Pat. Nos. 4,040,096 and 4,884,083. These prior art ROS system utilize a plurality of optical elements to generate and transmit modulated beams of light along an optical axis forming a modulated beam which scans across a photosensitive recording medium as a series of scan lines forming a latent electrostatic image thereon. A key component in all of these systems is a rotating polygon having a plurality of reflective mirrored surfaces, or facets. The modulated light beam output of the coherent light source, which may be a gas or diode laser, is directed across the multi-faceted polygon and light is reflected from each facet and directed as a scanning beam across the surface of the recording medium. As these ROS systems have evolved, faster printing speeds have been enabled by increasing the scan speed, necessitating the polygon to be driven at higher rotational speeds. These higher speeds have inherent image quality problems which hitherto have not been fully appreciated. At these rotational loads, it has been found that the radial surface of the facets of the rotating polygons undergo a centrifugal-force-induced deformation which, while relatively of small magnitude, may still have undesirable effects on the quality of the image being formed at the photosensitive surface. In other words to the extent that this deformation departs from the desired flat, or planar, reflecting surfaces the image formed by the reflected scanning beams at the recording surface is adversely affected. While this deformation induced error is quite small, it could absorb a significant percentage of the facet flatness tolerance allowed for a given polygon scanner.

The present invention is, therefore, directed to an analysis of the type and extent of the facet deformation produced in various polygon designs and towards techniques for compensating for this deformation, the deformation being predictable for specific system designs. According to a first aspect of the invention, radial facet distortion curves are analytically determined and plotted establishing the type of deformation or departure from a perfectly planar orientation which results at specified rotational speeds and for varying numbers of polygon facets. It is then demonstrated that the polygon facet surface for the selected design can then be manufactured or processed so as to create the reverse deformation curves in the facet surfaces so that, at the rotational loads, the deformation will produce the desired flatness at each facet surface.

According to another aspect of the present invention, a prediction of deformation characteristics is utilized to compensate, not only for the errors which would be created by the departure from flatness of each facet, but also to design the polygon geometry so that the deformation will produce a radial curve on the facet surface which can perform the function of a lens element such as an fθ lens which has hitherto been required to be placed in the optical path between the polygon and the recording medium. More particularly, the invention is directed towards a raster output scanning system comprising; means for generating a beam of high intensity, modulated coherent light, optical means for imaging said beam to a spot at the surface of a photosensitive image recording medium, a multifaceted polygon located in the path of said imaged beam between said beam generating means and said medium and having reflective facet surfaces for reflecting incident beams onto the medium, means for rotating said polygon at a rotational speed so that the reflected light is scanned as successive scan lines across said medium, the improvement wherein the surface of said facets at rest, have a predetermined non-flat surface which is distorted at said rotational speed, so as to assume a flat orientation.

DESCRIPTION OF THE INVENTION

Figure 1:
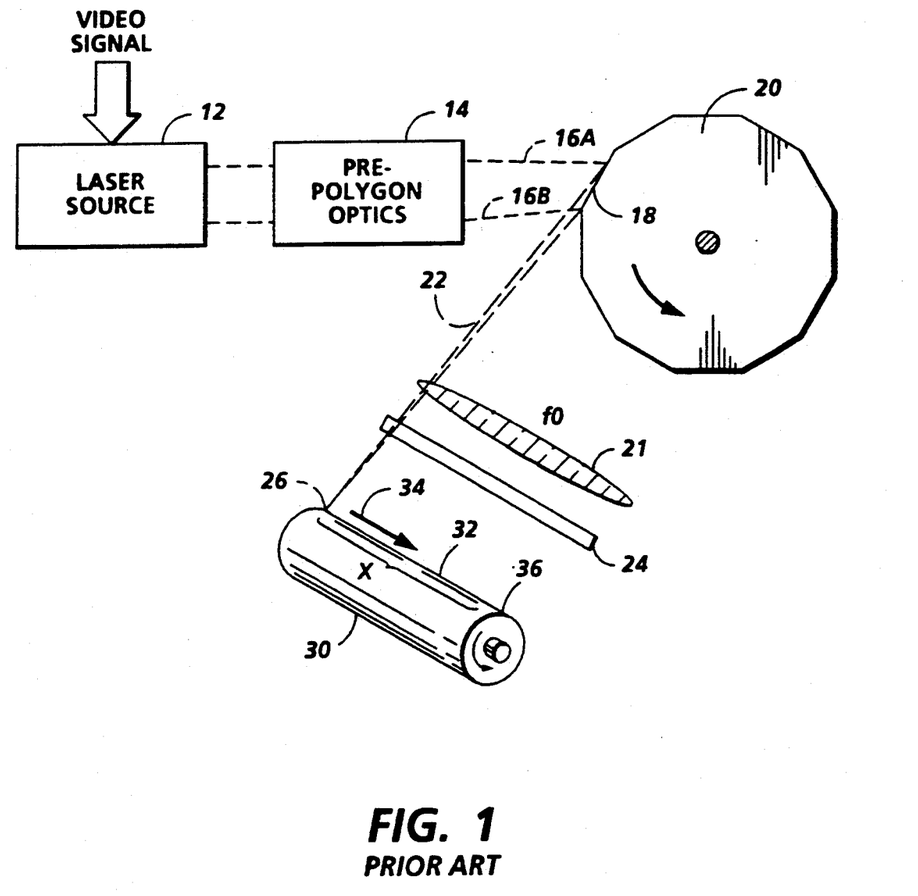
FIG. 1 shows a prior art ROS system incorporating a multi-faceted polygon scanner.

FIG. 1 illustrates a prior art ROS system wherein a laser diode 12 serves as the source of high-intensity coherent output beams of light. The laser output is self-modulated and the output beams of light are modulated in conformance with the information contained in a video signal. The modulated beams are expanded and focused by optical elements in a pre-polygon optical sub-system 14, as is known in the art, so that output beams 16a, 16b are formed which are directly incident on a facet 18 of rotating multi-faceted polygon 20. Facet 18 may be fully illuminated along its width as shown, or the beam can be compressed to a smaller spot on the facet surface.

The rotational axis of polygon 20 is orthogonal, or nearly orthogonal, to the plane in in which light beams 16a, 16b travels. The facets of polygon 20 are mirrored surfaces which reflect the light impinging thereon. They are generally machined and polished as flat as possible, allowing a typical tolerance of about 80 nanometers in the circumferential direction. With the rotation of polygon 20 in the direction shown by the arrow (by conventional drive means, such as a motor, not shown), the light beams are reflected from illuminated facet 18 and translated into a scan angle for flying spot scanning. The beam portion 22 reflected from facet 18 passes through an fθ lens 21 which is designed to focus the beam along the linear focal plane to eliminate the circular arc which is imparted to the beam as it is reflected along the facet surface. The beam are then projected through cylindrical lens 24 which has power only in the saggital direction (orthogonal to the direction of scan). Beam portion 22 is focused at start of scan point 26 on the surface of photoreceptor drum 30

The focused beam 22 is swept across the surface of drum 30 as a scan line 32 in the direction of arrow 34 reaching the end of scan position 36. Drum 30 is rotated in the process direction shown.

The system shown in FIG. 1 is subject to a slight deviation in the desired linearity and uniform spot size (shape) of the scanning beam across scan line 32 caused by deformation of facets 18 as they rotate at the selected polygon rotational speed. In other words, the surface of facet 18 is subjected to a centrifugal-induced radial deformation which, as will be seen, may either be concave or convex but which, in any event, causes the surface to depart from the desired flat plane orientation. An analysis of this deformation will now be considered, followed by various techniques to both compensate for the deformation and to positively use the predictable deformation to enhance the efficiency of the optical system by incorporating a desired deformation induced curvature at the facet surface at the rotational speed.

In order to understand the effects of facet deformation under rotational loads, the inventors conducted an analytical study utilizing the finite element method to evaluate the radial surface distortions of facets in a rotating polygon system. A series of parametric curves of maximum surface irregularity vs. number of facets for polygons of various inscribed radii, and rotational speeds was analyzed. Although the parametric curves were provided for polygons of a specific material (aluminum) of uniform axial thickness and no inside radius, they are equally applicable to other polygon designs as will be seen. The finite element method is described in detail in R. A. Cooks' *Concepts and Applications of Finite Element Analysis*, 2nd edition, John Wiley & Sons, N.Y. 1981.

Figure 2:
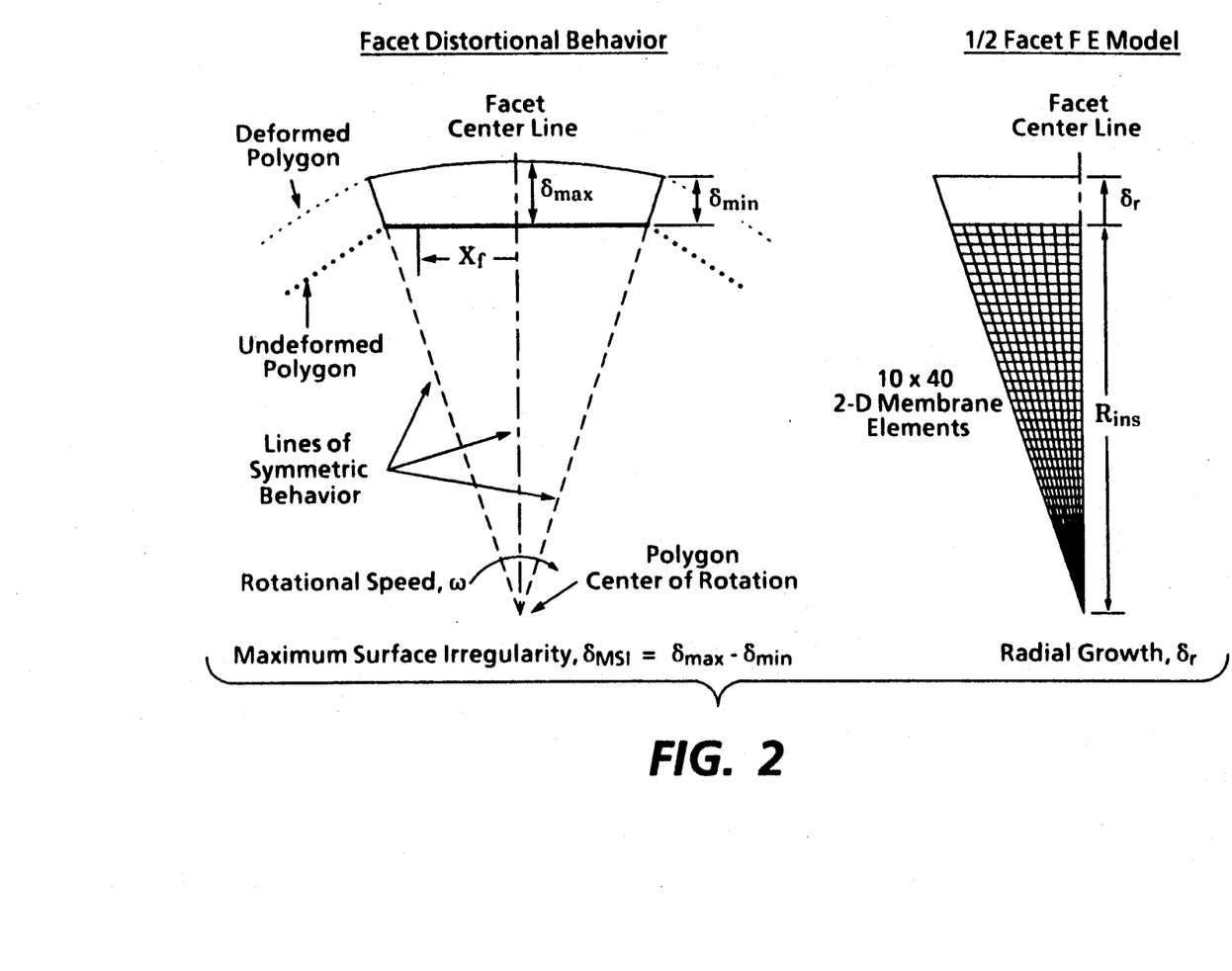
FIG. 2 is a schematic drawing illustrating distortional behavior of one of the facets of the polygon scanner of FIG. 1.

Turning now to FIG. 2, there is shown a schematic of facet 18 distortional behavior. A ½ facet finite element model for a 12 facet polygon with an inscribed radius of 1.5 inches is analyzed and the terminology used throughout the following analysis is set forth. Since steady rotational loading was applied about the polygon axis, only ½ of a facet had to modeled due to symmetric behavior. The rotational loading at rotational speed $\omega$ was high enough to produce facet deformation The results of these analyses are presented later in the form of parametric curves plotted against facet location $X_f$, and maximum surface irregularity, $\delta_{MSI}$.

Some simplifying assumptions were made. First, the behavior of the polygon in the axial direction was assumed to be negligible since most polygons are thin relative to the radial dimensions, and plane stress theory applies. This means that only polygon radial growth $\delta_r$ and facet deformation in the radial and circumferential direction was calculated. For spinning disks, variations in radial distortion in the axial direction are not significant, and facet surface deformation is only calculated in the circumferential plane. Second, polygon thickness was assumed uniform and continuous so geometric variations in thickness were not accounted for. Typically, variations in polygon thickness from center to outer radius for real designs are not significant. Finally, the parametric study of facet behavior did not account for a hole at the center of rotation or for mounting screws. It will be shown later that a hole at the center of the polygon can contribute significantly to the facet distortion.

Figure 3:
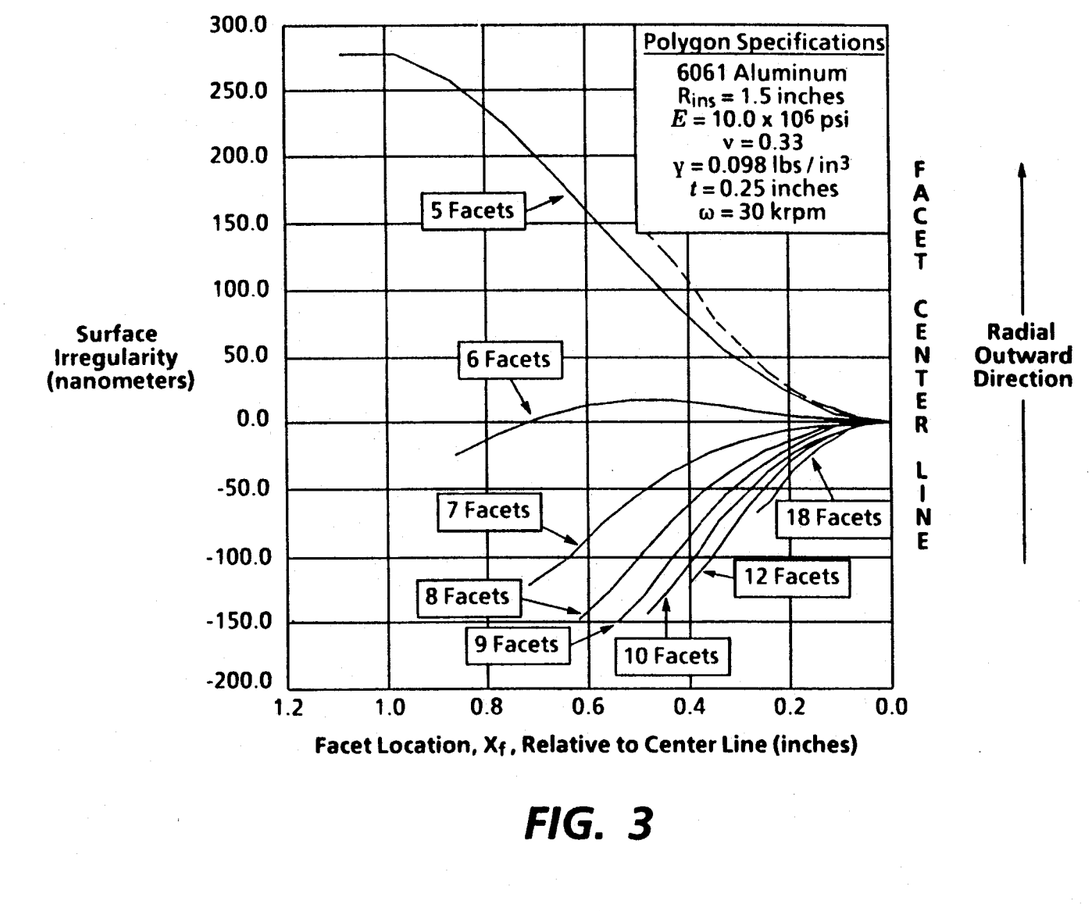
FIG. 3 is a graph of facet surface irregularity on the facet surface plotted for a specific facet design.

Considering again FIG. 2, it is assumed that the undeformed polygon surface is initially a perfectly flat plane. The maximum surface irregularity, $\delta_{MSI}$ is defined as the difference in the maximum normal surface irregularity, $\delta_{max}$, and the minimum normal surface displacement, $\delta_{min}$. $X_f$ is the facet location relative to the facet center line Using the finite element method, a polygon having the specification shown in FIG. 3 was analyzed for radial growth, wherein $R_{ins}$ is the inscribed radius of the undistorted facet at the facet center line, E is the modulus of elasticity, $\upsilon$ is the Poissons ratio; $\gamma$ is the weight density (weight per unit volume), and t is the thickness of the polygon. FIG. 3 shows surface irregularity data normalized relative to the deflection at the center of the facet for the polygon specification listed. In other words, the deformation at the center line is already at a nominal value of approximately 3700 nm. The normalization allows a visual comparison between facet behavior of various facet number polygons. Reviewing the data shows that a 5 facet polygon surface has a predominantly concave distortional behavior where 7 to 18 facet polygon surfaces have a predominantly convex distortional behavior. Also, the 6 facet design not only has a more complicated second order effect where neither concave nor convex dominates, and the maximum surface irregularity computes to be a minimum of 41 nanometers.

The trends described above remain the same for different rotational speeds and for different inscribed radii. Only the magnitude of the normal deflection was observed to change. Since this is a linear elastic analysis, the fact that the surface distortion changes as a function of rotational speed was not surprising. What was surprising was when the inscribed radii were changed, the identical trends in distortional behavior occurred (i.e., 5 facets—concave 7-18 facets—convex in, 6 facets—minimum surface irregularity). This independence on geometry is clearly a "distortional property" of spinning polygons.

Figure 4:
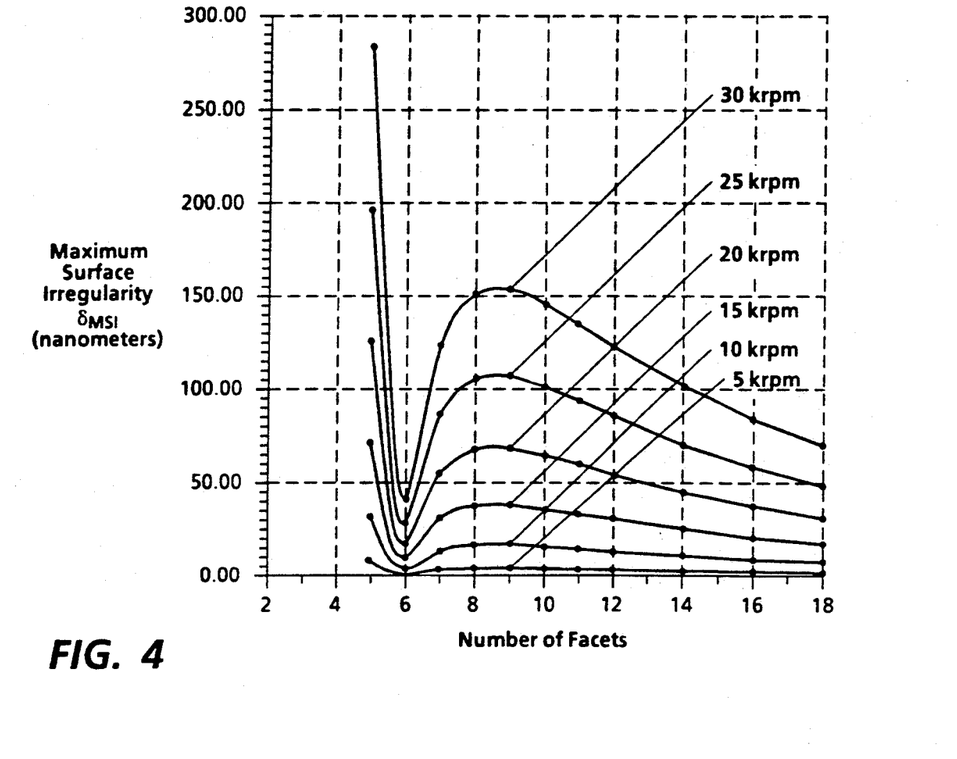
FIG. 4 is a graph of maximum facet surface irregularity verus the number of facets for a specific facet radius.

Because polygon surface specifications are typically cited in terms of maximum surface irregularity, additional graphs are necessary to show maximum surface irregularity $\delta_{MSI}$ plotted against the number of facets in a different rotational speeds. FIG. 4 shows the $\delta_{MSI}$ vs. the number of facets at rotational loads of 5-30 krpm for a polygon with the specifications of FIG. 3. Polygon facet flatness specifications are typically defined as a fraction of laser light wavelength. A maximum surface irregularity of ⅛λ is typical of laser printers and corresponds to approximately 80 nm of tolerable distortion (for a helium neon laser source). As shown in FIG. 4, for an $\omega$ of 30 krpm, the $\delta_{MSI}$ already produces 70 nm of error or ⅞ of the facet error specification allowed. Hence, the effects of facet distortion can be appreciable depending on specific designs.

Figure 5:
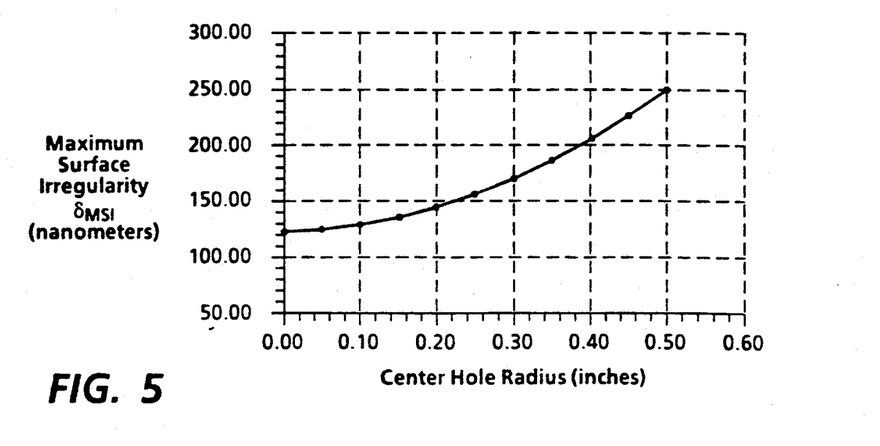
FIG. 5 is a graph showing a plot of maximum surface irregularity versus the radius of the center hole for the polygon spinner.

To complete the above analysis, one of the assumptions made was that the polygon disc would have zero radius center holes; (e.g., no center hole). However, a center-hole to accommodate the polygon drive shaft is required as a practical matter and, therefore, further evaluation will show the effects of center holes of varying radius on the maximum surface irregularity $\delta_{MSI}$. FIG. 5 shows a plot of maximum surface irregularity vs.

center hole radius for a 12 facet polygon with a 1.5 inch inscribed radius operating at a rotational speed of 30 krpm. At a center hole radius of 0.0 inch, a maximum surface irregularity was calculated at approximately 122 nm. This is consistent with the maximum surface irregularity data given for the 12 facet case in FIG. 4 for the same rotational speed. At a center hole radius which is ⅓ of the inscribed radius or 0.5 inch, the maximum surface irregularity better than doubles. Subsequent calculations on 12 facet polygons with inscribed radii of 1.5 inch, operating at different rotational speeds, indicate the same relative increases in maximum surface irregularity as a center hole radius is added. For example, the above polygon specification with a 0.0 inch center hole radius operating at 15 krpm is predicted from FIG. 4 to have a maximum surface irregularity of approximately 30 nm. If a center hole with a radius 0.5 inch were added, the maximum surface irregularity would double to 60 nm.

Additional calculations have also shown that the magnitude of surface irregularity and the shape of the deformed facet differ depending on the number of facets and the inscribed radius. It is apparent that the plots can be generated for polygon designs with different inscribed radius.

Armed with the insights derived from the plots of FIGS. 2-5, and according to a first aspect of the present invention, a polygon scanning system was designed so as to compensate for the effects of deformation. As one example, and considering the polygon design shown in FIG. 3, if a 10 facet design were to be implemented in a 25 krpm system which has a flatness tolerance of 80 nm, from FIG. 4 this system would have or $\delta_{MSI}$ increasing to 100 mm at the ends. This irregularity can be compensated for by machining the surfaces of each of the 10 facets so that they have a spherical surface with a curvature in a radial direction, and of a distortion opposite to that shown in FIG. 3; e.g., to the 10 facet curve. Since the 10 facet curve was convex, the facets are manufactured with a concave compensating curvature shown in dotted line form in FIG. 3. The additional curvature contributed by the center hole radius is added to this curvature to arrive at the final deformation curve which must be incorporated into each facet surface during manufacture This curvature can be imparted to each surface using milling and polishing techniques. If many polygons are to be manufactured for the specific system, a master can be made and replicated. It is understood from the above, that the polygon, when performing at the rotational load, will be deformed so that the facets with the concave formed surface will be distorted so that the facet surfaces assume the desired flatness at the rotational load speed.

Figure 6:
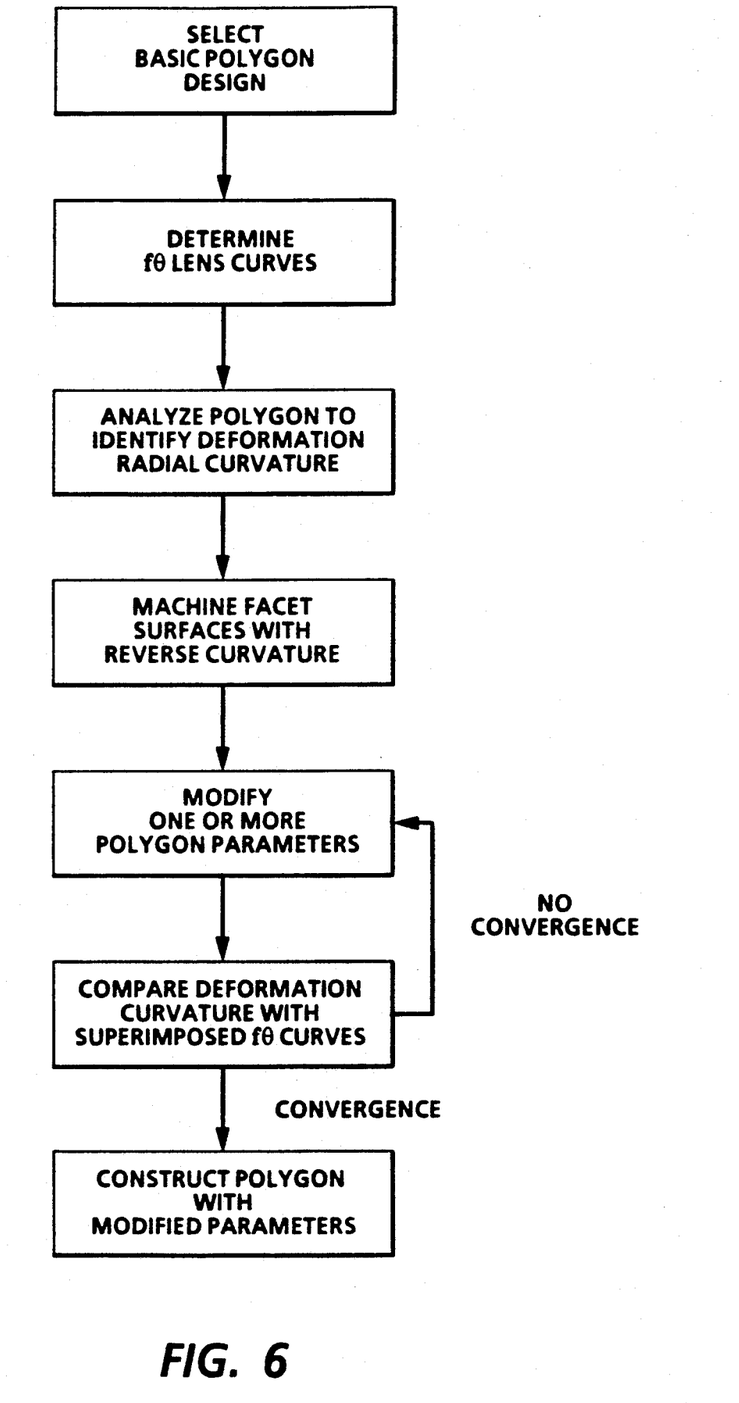
FIG. 6 is a flow chart setting forth the steps for modifying the facet surfaces of the polygon body to form a lens profile at the facet surface at the rotational load.
Figure 7:
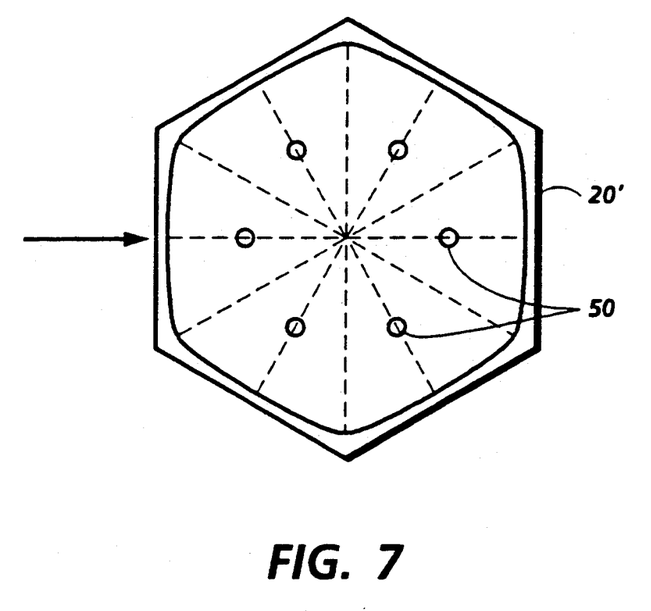
FIG. 7 is a top view of a polygon modified to change the characteristics of the facet deformation at rotational speeds.

Considering next, a second aspect of the invention, in FIG. 1, an $f\theta$ lens 21 was required to be positioned between the polygon 20 and the drum 30. The $f\theta$ correction is a well understood phenomenon described, for example, in U.S. Pat. No. 4,833,429. The correction is usually accomplished by means of a correcting lens which has the net effect of focusing the reflected beams, with minimum perturbations, as a straight scanning line 32. The type of curved beam path the reflected rays must undergo is well understood by lens designers and a series of curves are derived analytically and then transferred into physical form by forming a lens of the required spherical shape. Using the insights derived from the plots of FIGS. 2-5, it becomes apparent that the deformation character of the polygon facets at the rotational speeds can be utilized to design a polygon so that it will deform, at the operational load, with a radial curvature which will compensate for facet distortion and/or to perform the function of the $f\theta$ lens. This design requires an analysis of each polygon design along the lines performed above when analyzing the radial deformation. The correction process is modified so as to enable the deformation to be large enough to form the required curvature which will, in effect, substitute for the spherical surfaces of the $f\theta$ lens. Thus, other design considerations are analyzed and a polygon design is modified so as to bring about the required curvature. Besides rotational loads, other factors affecting deformation are the aforementioned center hole radius. Also a factor are changes in material which affect E (modulus of elasticity) and $\gamma$ (the weight density). For example, a change of material from aluminum to polycarbonate will increase the convexity of the deformation. Another factor which will affect the type and extend of deformation is changes to the continuum. For example, and as shown in FIG. 7, if holes 50 are formed in polygon 20' in a symmetrical fashion through the polygon bulk, the deformation reduces stiffness increasing deformation. Other types of operative geometry, other than circular, may be used. Thus, the actual deformation of each polygon design can be modified by changing any or a combination of these parameters and this can be done on an iterative basis in conjunction with the flow chart step shown if FIG. 6. Referring to FIG. 6, it is assumed that a particular ROS system has been designed to require a specific rotational load and a polygon design of 6 or more facets have been selected. The characteristics in the $f\theta$ lens which would normally be required are first identified and the $f\theta$ lens curves are generated. Using the previously designed finite element method analysis, the deformation curve which would otherwise be imparted to the polygon facets at the rotational speeds is generated (as in FIGS. 2 to 4) and the polygon surfaces are formed with the reverse curvature. At this point the polygon design is corrected for scan deformation error, but will not yet perform the $f\theta$ lens function. From the $f\theta$ lens curves, it would be generally understood that the additional radius deformation correction desired may increase the concave aspects of the deformation. An iterative process is then begun comparing modification to one or more parameters of the polygon itself, e.g., continuum changes by removing selected portions of the bulk, change of materials. With each modification, the desired $f\theta$ lens curve is superimposed on the deformation curves predicted by these modifications until convergence is obtained. At this point the final polygon design is realized and the polygon can be manufactured, and the facet surfaces formed. Thus, upon completing this design the faceted surfaces of the polygon at the rotational speeds will be formed in such a manner that the distortional convex surfaces at rotational speed, of each facet will not only correct for facet distortion, but will also provide the desired $f\theta$ lens function.

While the invention has been described with reference to the structure disclosed, it will be appreciated that numerous changes and modifications are likely to occur to those skilled in the art, and it is intended to cover all changes and modifications which fall within the true spirit and scope of the invention. For example, while the lens design is modified so as to impart to the facets at rotational speeds, a distortion which produces an f which performs a function of a $f\theta$ lens, other types of lens functions may be reproduced; for example, the function of the cylindrical lens 24 of FIG. 1. Also, while the process for forming a facet which distorts to a lens function was combined with the flatness correction, it may be done in the absence of the flatness correction.

We claim:

1. A raster output scanning system comprising;
   means for generating a beam of high intensity, modulated coherent light, optical means for imaging said beam to a spot at the surface of a photosensitive image recording medium,
   a multifaceted polygon located in the path of said imaged beam between said beam generating means and said medium and having reflective facet surfaces for reflecting the incident beam onto the medium, and
   means for rotating said polygon at a rotational speed so that the reflected light is scanned as successive scan lines across said medium, the improvement wherein the surface of said facets at rest, have a predetermined irregular non-flat surface which is distorted at said rotational speed, so as to assume a flat orientation.

2. A method for compensating polygon-type scanners having a plurality of mirrored facet surfaces for the effects of facet surface deformation at rotational load including the steps of:
   analytically determining at least a 2 dimensional radial curvature deformation each facet will undergo at operational rotational load and
   forming the reverse amount of deformation on said polygon facet surfaces so as to compensate for said deformation effects, wherein the facet surfaces are deformed to assume a flat orientation at said rotational load.

3. The method of claim 2 wherein said analytical determination step includes the distortional effects produced by a center hole formed in the scanner.

4. A raster output scanning system comprising;
   means for generating a beam of high intensity, modulated coherent light, optical means for imaging said beam to a spot at the surface of a photosensitive image recording medium,
   a multifaceted polygon located in the path of said imaged beam between said beam generating means and said medium and having reflective facet surfaces for reflecting the incident beam incident onto the medium, and
   means for rotating said polygon at a rotational speed so that the reflected light is scanned as successive scan lines across said medium, the improvement wherein the surface of said facets at rest have a predetermined non-flat surface which is distorted at said rotational speed, so as to assume a curvature which reproduces the focusing characteristics of a lens.

5. The scanning system of claim 4 wherein said lens is in an $f\theta$ lens.

6. A method for forming a polygon scanner with facet surfaces which distort at operational rotational speeds to a convex lens shape including the steps of:
   identifying the lens shape to be imparted to the lens at rotational load, and
   modifying the polygon scanner properties in an iterative fashion until the polygon facets are deformed into a lens shape at operational rotational speed, which matches the identified lens shape.

7. The method of claim 6, wherein said lens shape is an $f\theta$ lens.

8. The method of claim 6 wherein said properties include at least the modules of elasticity and the weight density.

9. The method of claim 6 wherein said properties include at least the polygon continuum.

* * * * *